INFORMATION STORAGE AND TRANSFER SYSTEM

Filed May 16, 1963 3 Sheets-Sheet 1

INVENTOR
P. MALLERY
BY
William H. Kamstra
ATTORNEY

"0"
(OR "CLEAR")

"1"

"1" PRIME

"0"
(OR "CLEAR")

"1"

"1" PRIME

"0"
(OR "CLEAR")

"1"
(OR "SET")

"1" PRIME

"1" PRIME

"1"
(OR "SET")

FIG. 5

| | | TIME | SOURCE ACTIVATED |
|---|---|---|---|
| | | $t_1$ | COUNT SOURCE 18 |
| SR FIRST CYCLE | | $t_2$ | BIT PULSE SOURCE 25 AND B PHASE ADVANCE PULSE SOURCE 29 |
| SR FIRST CYCLE | C FIRST FORWARD CYCLE | $t_3$ | A PHASE PRIME PULSE SOURCE 31 |
| SR FIRST CYCLE | C FIRST FORWARD CYCLE | $t_4$ | A PHASE ADVANCE PULSE SOURCE 27 AND A PHASE STEP PULSE SOURCE 14 |
| SR FIRST CYCLE | | $t_5$ | B PHASE PRIME PULSE SOURCE 33 |
| SR SECOND CYCLE | | $t_6$ | BIT PULSE SOURCE 25 AND B PHASE ADVANCE PULSE SOURCE 29 |
| SR SECOND CYCLE | C SECOND FORWARD CYCLE | $t_7$ | A PRIME PULSE SOURCE 31 |
| SR SECOND CYCLE | C SECOND FORWARD CYCLE | $t_8$ | A PHASE ADVANCE PULSE SOURCE 27 AND B PHASE STEP PULSE SOURCE 16 |
| SR SECOND CYCLE | | $t_9$ | B PHASE PRIME PULSE SOURCE 33 |
| | C FIRST REVERSE CYCLE | $t_{10}$ | PRIME PULSE SOURCE 20 |
| | C FIRST REVERSE CYCLE | $t_{11}$ | A PHASE STEP PULSE SOURCE 14 |
| | C SECOND REVERSE CYCLE | $t_{12}$ | PRIME PULSE SOURCE 20 |
| | C SECOND REVERSE CYCLE | $t_{13}$ | B PHASE STEP PULSE SOURCE 16 |

United States Patent Office 3,334,337

Patented Aug. 1, 1967

3,334,337

INFORMATION STORAGE AND TRANSFER SYSTEM

Paul Mallery, Murray Hill, N.J., assignor to Bell Telephone Laboratories, Incorporated, New York, N.Y., a corporation of New York Filed May 16, 1963, Ser. No. 280,891
7 Claims. (Cl. 340—174)

ABSTRACT OF THE DISCLOSURE

Independent write and read rates are achieved in shift register operation by associating a stage of an auxiliary counter with each stage of the shift register. When a bit stream is advanced through the shift register, a set state is advanced to the counter stage corresponding to the shift register stage occupied by the foremost bit of that stream. Interrogation is by means of resetting the counter. Only the set stage resets, and in so resetting interrogates destructively the corresponding shift register stage. Simultaneously, the counter stage corresponding to the shift register stage occupied by the next subsequent bit is set.

Figure 1:
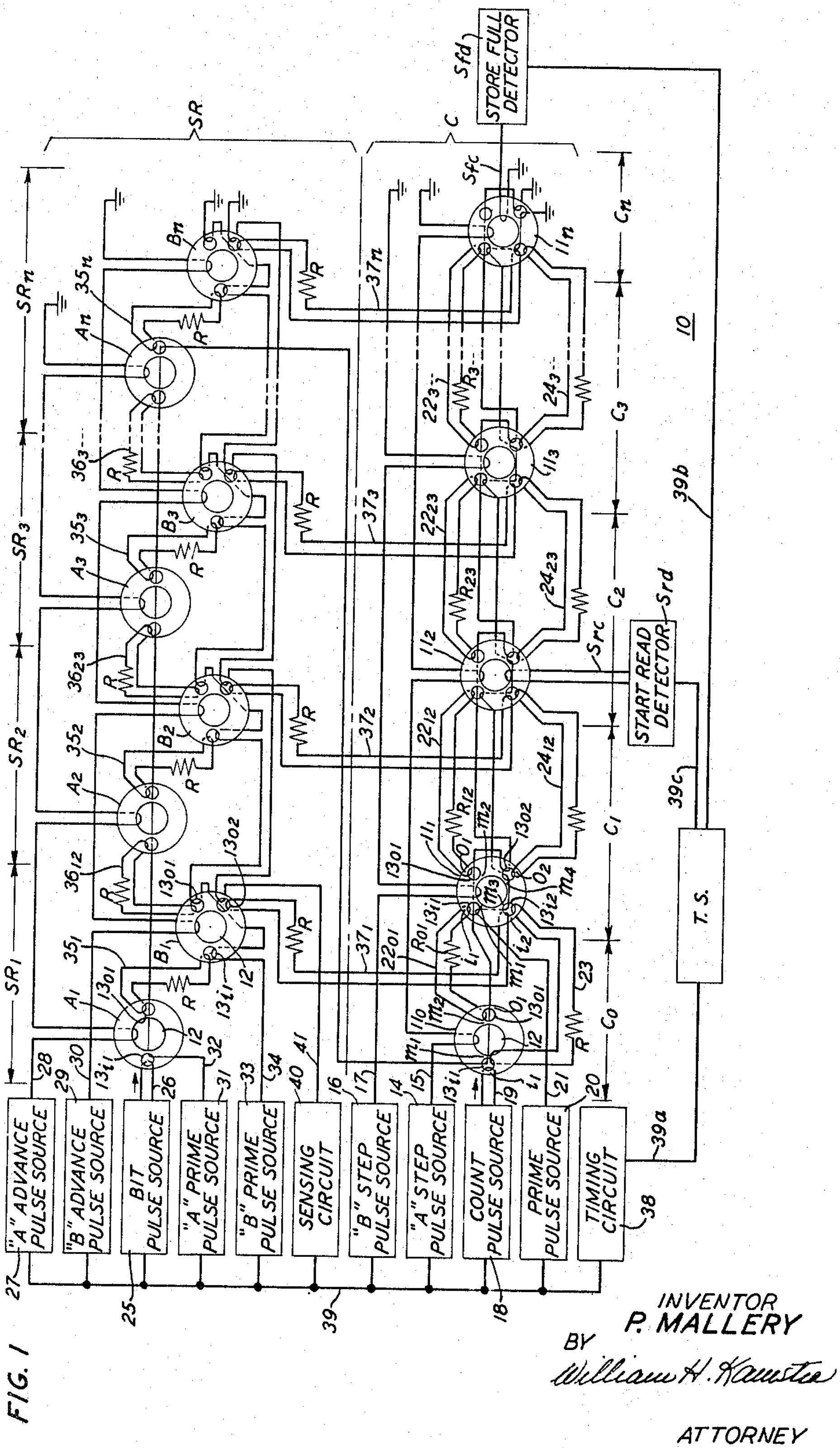

This invention relates to information handling systems. More particularly, this invention relates to an information storage and transfer system that may be used as a buffer storage between information handling systems that operate at different processing rates.

In the transfer of information from one information handling system to another, for example, from a computer to a transmission system, difficulties may arise because the rates at which the computer handles information may differ from that of the transmission system. Moreover, the transmission system may be called upon to service other computers which operate at still different processing rates. In addition, the various computors and transmission systems frequently operate with different word lengths. In this connection, a "word length" is the number of binary coded information bits which constitute meaningful information in the logic organization in which the particular system operates. That is, the word length or block handled by a particular computor may be, for example, ten, twelve or one hundred binary digits or bits while the word block handled by the transmission system may be twenty-six bits. Therefore, it is frequently difficult, among other things, to synchronize these systems to a common timing reference. In order to transfer information between two such systems, an information storage, commonly termed a "buffer storage," is required which can operate at information rates compatible with both systems and which either has a controllably variable word length or, preferably, is operable independent of word length.

Accordingly, an object of this invention is a new and improved buffer storage system.

A further object of this invention is a system for transferring information between information handling systems that operate at different processing rates.

A still further object of this invention is a buffer storage which makes an information transmission system compatible with a variety of information processing systems which operate at a variety of processing rates and/or word lengths.

These and other objects of this invention are realized, in one illustrative embodiment thereof, comprising a shift register including a plurality of stages capable of having a sequence of binary bits shifted therealong and a reversible counter or stepping switch also having a sequence of stages each of which is associated with a different stage of the shift register. The advance of a sequence of information bits through the stages of the shift register is paralleled by the advance of an identifying condition from stage to stage through the counter. For read out, the identifying condition is stepped backwards through the counter from stage to stage thereby producing at each stage a signal for interrogating the associated shift register stage. The output of each shift register stage is sensed by conventional means.

Thus, in accordance with this invention, it is a feature thereof that the read out of each stage of a shift register is accomplished in situ by applying a read-out pulse to a reversible counter which in response thereto provides a signal for interrogating an associated shift register stage each time the counter is stepped backward one stage.

The invention and the objects and features thereof will be understood more fully from a consideration of the following detailed description taken in conjunction with the accompanying drawing in which:

FIG. 1 depicts one specific illustrative buffer storage circuit in accordance with this invention;

FIGS. 2*a*, 2*b*, 2*c*, 3*a*, 3*b*, 3*c*, 4*a*, 4*b*, 4*c*, 4*d* and 4*e* illustrate the various transfluxors of the buffer storage circuit of FIG. 1 in the various flux patterns into which they are driven during the operation thereof; and FIG. 5 is a schedule of drive pulse deliveries designating the pulse sources for their provision in accordance with this invention.

It is to be understood that the figures are not necessarily to scale, certain dimensions thereof being exaggerated for the purpose of illustration.

In FIG. 1 there is shown a buffer storage circuit 10 comprising a reversible counter or stepping switch C and a shift register SR. The counter C includes a plurality of stages $C_0$, $C_1$, $C_2$, $C_3$ . . . $C_n$. Each counter stage includes a transfluxor 11 bearing a subscript corresponding to that of the stage.

The transfluxors 11 are of a magnetic material characterized by a substantially rectangular hysteresis characteristic and each includes a plurality of apertures therein. Specifically, transfluxor $\mathbf{11}_0$ includes a relatively large central aperture 12 and two smaller radial apertures $\mathbf{13}_{I1}$ and $\mathbf{13}_{O1}$ which define one input, two middle and one output leg, $i_1$, $m_1$, $m_2$ and $o_1$, respectively, each being equally flux limited. For convenience, each leg is taken as carrying one unit of flux. The remaining counter transfluxors $\mathbf{11}_1$ through $\mathbf{11}_n$ include, in addition to the sole central aperture, four radial apertures, $\mathbf{13}_{I1}$, $\mathbf{13}_{I2}$, $\mathbf{13}_{O1}$ and $\mathbf{13}_{O2}$, respectively, and defining two input, four middle and two output legs, $i_1$, $i_2$, $m_1$, $m_2$, $m_3$, $m_4$ and $o_1$ and $o_2$, having equal flux capacity. The additional apertures add to the transfluxor the capability of having flux switched thereabout for purposes which will become apparent hereinafter. For consistency of designations among the various transfluxors, the apertures to the left (as viewed in FIG. 1) of radial aperture $\mathbf{13}_{I1}$ are designated input apertures and those to the right of radial aperture $\mathbf{13}_{O1}$ are designated output apertures. However, as will become apparent hereinafter, when the counter C is stepped backward, legs $o_2$ and $i_2$ perform functionally as the input and ouput legs, respectively. For simplicity these reference designations are shown only in connection with transfluxor $\mathbf{11}_1$.

An A phase pulse source 14 designated the A step pulse source is coupled to counter transfluxor $\mathbf{11}_0$ and the even numbered counter transfluxors $\mathbf{11}_2$ . . . $\mathbf{11}_n$ by means of a conductor 15 threaded serially and in the same sense through the central apertures thereof. Similarly, a B phase step pulse source 16 is coupled to the odd numbered counter transfluxors $\mathbf{11}_1$, $\mathbf{11}_3$ et seq. by means of a conductor 17 threaded serially in the same sense through the central apertures thereof. Both conductors 15 and 17 terminate at ground potential. A count pulse source 18 is coupled to the counter transfluxor $\mathbf{11}_0$ by means of a conductor 19 threaded through the input radial aperture $\mathbf{13}_{I1}$ thereof. A prime pulse source 20 is coupled serially to counter transfluxors $\mathbf{11}_1$, $\mathbf{11}_2$, $11_3$ . . . $11_n$ by means of a conductor 21 threaded in an alternating sense through the apertures $13_{i1}$, $13_{i2}$ and $13_{o2}$ of each counter transfluxor $11_1$, $11_2$, $11_3$ . . . $11_n$. Conductor 21 also is terminated at ground potential.

Transfer loops couple together successive counter transfluxors by means of a plurality of conductors 22 each of which is threaded in the opposite sense through the output radial aperture $13_{o1}$ and the input radial aperture $13_{i1}$, respectively, of successive counter transfluxors. Each transfer loop includes a resistance R. In addition to the aforementioned transfer loops, another transfer loop couples together counter transfluxors $11_0$ and $11_1$ by means of a conductor 23 threaded in the same sense through the input apertures $13_{i1}$ of counter transfluxor $11_0$ and the input aperture $13_{i2}$ of transfluxor $11_1$. This transfer loop also includes a resistance R. Similarly, additional transfer loops couple together the counter transfluxors $11_1$, $11_2$, $11_3$ . . . $11_n$ by means of a plurality of conductors 24 threaded in the opposite sense through the output aperture $13_{o2}$ and the input aperture $13_{i2}$ of successive transfluxors, respectively. Here too, the transfer loops include resistors R. The various transfer loops bear subscripts to denote the transfluxors coupled thereby.

The resistances in the various transfer loops may vary in accordance with this invention from a minimum value representing the inherent resistance of the transfer loop to a maximum value related in a well known manner to the amplitude of the prime pulses described hereinafter. However, because these resistances fulfill well known functions, further description thereof is deemed unnecessary and most of their subscripts are omitted for the sake of clarity.

The shift register SR includes a plurality of stages $SR_1$, $SR_2$, $SR_3$ . . . $SR_n$. Each shift register stage includes a pair of transfluxors in an arrangement commonly termed "two-core-per-bit." This arrangement is operated in a storage and a transfer phase as will become apparent hereinafter, and the transfluxors are alternately referenced $A_1$, $A_2$, $A_3$ . . . $A_n$, and $B_1$, $B_2$, $B_3$ . . . $B_n$ to correspond respectively to these operational phases.

Each A transfluxor includes one central and two radial apertures as does counter transfluxor $11_0$ defining, as above, four flux carrying legs, two middle legs $m_1$ and $m_2$, an input leg $i_1$ and an output leg $o_1$. Each B transfluxor includes not only one central and two radial apertures but an additional radial aperture which defines in each B transfluxor an additional middle leg $m_4$, and an additional or second output leg $o_2$ having equal flux capacity. The shift register B transfluxors have no leg $m_3$. The designation of the apertures and legs of the various transfluxors correspond to that designation used in connection with counter transfluxors $11_0$ and $11_1$. For simplicity, the designations for the remaining transfluxors are omitted from the drawing.

A bit pulse source 25 is coupled to the shift register transfluxor $A_1$ by means of a conductor 26 threaded through the input aperture $13_{i1}$ thereof. An A advance pulse source 27 is coupled to each shift register transfluxor $A_1$, $A_2$, $A_3$ . . . $A_n$ by means of a conductor 28 threading in the same sense serially the central aperture 12 of these transfluxors and terminating at ground potential. Similarly, a B advance pulse source 29 is coupled to each shift register transfluxor $B_1$, $B_2$, $B_3$ . . . $B_n$ by means of a conductor 30 threading in the same sense serially the central aperture 12 of these transfluxors and terminating at ground potential. An A phase prime pulse source 31 is coupled to each shift register A transfluxor and each counter transfluxor by means of a conductor 32 threading serially in the same sense the sole input and output apertures $13_{i1}$ and $13_{o1}$ of shift register transfluxors $A_1$, $A_2$, $A_3$ . . . $A_n$ and the sole input and output apertures of counter transfluxor $11_0$. Conductor 32 also threads serially in one sense the input aperture $13_{i1}$, and in the opposite sense the output aperture $13_{o1}$ and the output aperture $13_{o2}$ of each counter transfluxor $11_1$, $11_2$, $11_3$ . . . $11_n$. The conductor 32 terminates at ground potential. A B phase prime pulse source 33 is coupled to each shift register B transfluxor by means of a conductor 34 threading serially in one sense the sole input aperture $13_{i1}$, and in the opposite sense the second output aperture $13_{o2}$ and the first output aperture $13_{o1}$ successively of each transfluxor $B_1$, $B_2$, $B_3$ . . . $B_n$ and terminating at ground potential.

The shift register A and B transfluxors are alternately coupled together by two transfer loop sets. One transfer loop set comprises a plurality of conductors 35 each of which threads in the opposite sense the sole output aperture $13_{o1}$ of each A transfluxor and the sole input aperture $13_{i1}$ of the next B transfluxor. The conductors 35 bear subscripts denoting the shift register stage to which they correspond. The other transfer loop set comprises a plurality of conductors 36 each of which threads in the opposite sense the output aperture $13_{o1}$ of each B transfluxor and the sole input aperture $13_{i1}$ of the next succeeding A transfluxor. The conductors 36 also bear subscripts denoting the transfluxors coupled thereby. Because stage *n* is the terminal stage of the shift register it includes only one transfer loop comprising a conductor 35. The shift register B transfluxors are coupled to the associated counter transfluxor by a transfer loop set, each loop comprising conductor 37, threading in the opposite sense the input aperture $13_{i2}$ of the counter transfluxor and the output aperture $13_{o2}$ of the associated shift register B transfluxor. Each conductor 37 bears subscripts denoting the counter stage to which it corresponds. Each conductor 35, 36 and 37 includes a resistance R. A timing circuit 38 is connected to each pulse source 14, 16, 18, 20, 25, 27, 29, 31 and 33 by means of conductors illustrated in a representative form by line 39.

Sensing the output of the shift register SR is accomplished through sensing circuit 40 which is coupled to each shift register B transfluxor by means of a conductor 41 threading serially the output aperture $13_{o2}$ of successive shift register B transfluxors and terminating at ground potential. Sensing circuit 40 is adapted to receive the outputs of the shift register in successive time slots as will appear hereinafter.

Figure 2A:
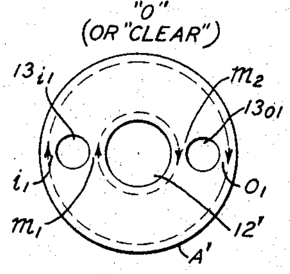

The various transfluxors of the illustrative buffer storage circuit of FIG. 1 and the flux patterns occurring therein will be designated and discussed separately for providing a convenient reference in the later discussion of the operation of the buffer storage circuit. In this connection, FIG. 2*a* shows a transfluxor A′ having a large central aperture 12 and two radial apertures $13_{i1}$ and $13_{o1}$ defining the legs $i_1$, $m_1$, $m_2$ and $o_1$ as described hereinbefore. Transfluxor A′ represents not only the shift register A transfluxors but also the counter transfluxor $11_0$. The "zero" or "clear" state is characterized as magnetic flux directed in the clockwise direction about the central aperture 12, that is, as magnetic flux directed upward in legs $i_1$ and $m_1$, and downward in legs $m_2$ and $o_1$ as viewed in the figure.

Figure 2B:
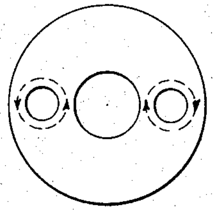
Figure 2C:
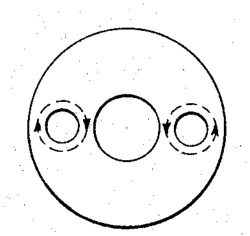

FIGS. 2*b* and 2*c* illustrate the three-aperture transfluxor A′ of FIG. 2*a* including further flux patterns to which it may be driven during operation. Specifically, in FIG. 2*b*, the flux pattern corresponds to a stored "one" state characterized by magnetic flux directed counterclockwise about the radial aperture $13_{i1}$ and clockwise about the radial aperture $13_{o1}$, that is downward in legs $i_1$ and $o_1$, and upward in legs $m_1$ and $m_2$ as viewed in the figure. FIG. 2*c* illustrates the stored "one" state after the transfluxor A′ is primed. The magnetic flux is directed clockwise about radial aperture $13_{i1}$ and counterclockwise about radial aperture $13_{o1}$ or upward in legs $i_1$ and $o_1$, and downward in legs $m_1$ and $m_2$ as viewed FIGS. 3*a*, 3*b* and 3*c* illustrate a four-aperture transfluxor B′ in the various flux states to which it is driven during operation of the buffer storage circuit of FIG. 1.

Figure 3A:
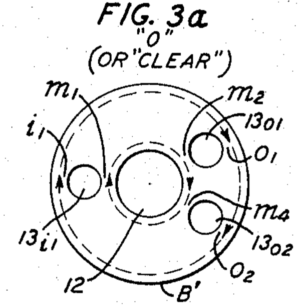
Figure 3B:
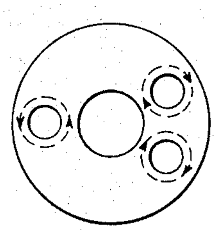
Figure 3C:
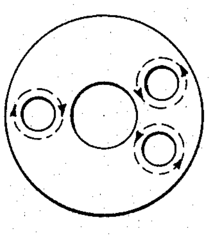

The transfluxor B′ of FIG. 3*a* includes a central aperture 12, a single input radial aperture 13 $_{i1}$ and two output apertures 13$_{o1}$ and 13$_{o2}$ defining legs $i_1$, $m_1$, $m_2$, $o_1$, $m_4$ and $o_2$.

The "zero" or "clear" state is shown as magnetic flux in the clockwise direction about aperture 12, that is, flux directed upward in legs $i_1$ and $m_1$ and downward in legs $m_2$, $m_4$, $o_1$ and $o_2$ as viewed in the figure. The stored "one" state for transfluxor B′ is illustrated in FIG. 3*b* as flux directed counterclockwise about the radial aperture 13$_{i1}$ and clockwise about radial apertures 13$_{o1}$ and 13$_{o2}$, that is, upward in legs $m_1$, $m_2$ and $m_4$, and downward in legs $i_1$, $o_1$ and $o_2$ as viewed in the figure. The "one" prime state for transfluxor B′ is shown in FIG. 3*c* as flux directed clockwise about radial aperture 13$_{i1}$ and counterclockwise about radial apertures 13$_{o1}$ and 13$_{o2}$ or as flux directed downward in legs $m_1$, $m_2$ and $m_4$, and upward in legs $i_1$, $o_1$ and $o_2$ as viewed in the figure.

FIGS. 4*a*, 4*b*, 4*c*, 4*d* and 4*e* illustrate a five-aperture transfluxor 11′ in the various flux states to which it is driven during operation of the buffer storage circuit of FIG. 1. The transfluxor 11′ of FIG. 4 includes a large central aperture 12, two input apertures 13$_{i1}$ and 13$_{i2}$ and two output apertures 13$_{o1}$ and 13$_{o2}$ defining legs $i_1$, $m_1$, $i_2$, $m_3$, $m_2$, $o_1$, $m_4$ and $o_2$, respectively.

Figure 4A:
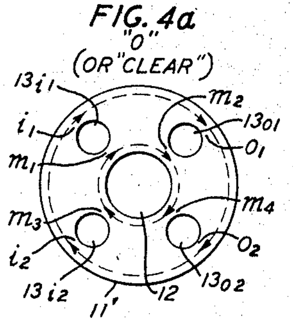
Figure 4B:
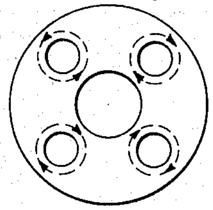
Figure 4C:
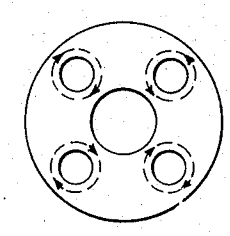

The "zero" or "clear" state is shown in FIG. 4*a* as flux directed in the clockwise direction about aperture 12, that is, as flux directed upward in legs $i_1$, $i_2$, $m_1$ and $m_3$, and downward in legs $m_2$, $m_4$, $o_1$ and $o_2$ as viewed in the figure. FIG. 4*b* shows the "one" or "set" state as flux directed counterclockwise about radial aperture 13$_{i1}$ and clockwise about radial aperture 13$_{i2}$, 13$_{o1}$ and 13$_{o2}$, that is as flux directed downward in legs $i_1$, $m_3$, $o_1$ and $o_2$, and upward in legs $m_1$, $i_2$, $m_2$ and $m_4$ as viewed in FIG. 4*b*. The "one" prime state is shown in FIG. 4*c* as flux directed clockwise about radial apertures 13$_{i1}$, 13$_{i2}$ and 13$_{o2}$ and counterclockwise about radial aperture 13$_{o1}$, that is as flux directed downward in legs $m_1$, $m_3$, $m_2$ and $o_2$, and upward in legs $i_1$, $i_2$, $o_1$ and $m_4$ as viewed in FIG. 4c.

Figure 4D:
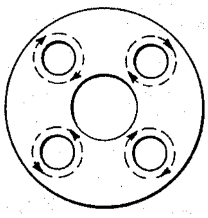
Figure 4E:
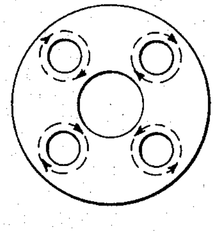

The transfluxor 11′ is capable of assuming another flux pattern corresponding to a stored "one" or "set" state as shown in FIG. 4*e*. In this figure, the flux about radial aperture 13$_{o2}$ is in the counterclockwise direction and the remaining flux is in the clockwise direction about apertures 13$_{i2}$, 13$_{o1}$ and 13$_{i1}$, that is, the flux is directed downward in legs $m_4$, $o_1$, $m_3$ and $m_1$, and upward in legs $o_2$, $m_2$, $i_2$ and $i_1$ as viewed in FIG. 4*e*. Similarly, the "one" prime condition can be represented by a second flux pattern as shown in FIG. 4*d*. There the flux is directed in a clockwise direction about radial apertures 13$_{o2}$, 13$_{o1}$ and 13$_{i1}$ and in a counterclockwise direction about aperture 13$_{i2}$, that is, the flux is directed downward in legs $o_1$, $o_2$, $i_2$ and $m_1$ and upward in legs $m_4$, $m_2$, $m_3$ and $i_1$ as viewed in FIG. 4*d*. The flux patterns of FIGS. 4*d* and 4*e* are observed when the counter is stepped backward for read out as will become apparent from the following description of the operation of the buffer storage circuit of FIG. 1.

The operation of the buffer storage circuit of FIG. 1 is considered for the following illustrative assumed sequence of operation wherein a binary "zero" is introduced as the first bit, a binary "one" is introduced as the second bit, the first bit is read out, and the second bit is read out. In this connection, the two information bits described may be assumed to constitute only a portion of a word in the logic system of the source. It is to be understood that the time designations in the following description of the operation are intended merely to serve as chronological benchmarks for the entire operation described for the illustrative embodiment. These times are not to be confused with a normal "cycle of operation" in the conventional usage of the term. The correspondence between the chronological benchmarks and a cycle of operation in connection with normal operation of a shift register and counter is shown in the legend to the left of FIG. 5 and will be discussed hereinafter.

Initially, all the transfluxors of both the shift register and the counter are in a "clear" state. That is, all the magnetic flux through the legs in each transfluxor is directed in a clockwise direction about the central aperture as shown in FIGS. 2*a*, 3*a* and 4*a*.

Operation in accordance with this invention is initiated at time $t_1$ by activating under the control of timing circuit 38 which similarly controls the other pulse sources herein described, the count pulse source 18 as designated in FIG. 5, thereby pulsing conductor 19 for driving counter transfluxor 11$_0$ to the stored "one" state shown in FIG. 2*b*. For this purpose, pulse source 18 as well as each of the pulse sources described in connection with this invention is entirely conventional and may comprise any well known electron tube device, magnetic core drive or transistor driven pulse transformer which applies a conventional drive pulse. Similarly, timing circuit 38 may be any well known timing circuit capable of synchronizing the energization of the pulse sources to which it is connected.

At time $t_2$, the bit pulse source 25 is activated initiating a normal shift register cycle of operation. Since it is intended to store a "zero" at this time, no pulse is applied thereby to conductor 26 for driving the flux in shift register transfluxor $A_1$. Transfluxor $A_1$, thus, remains in a "clear" state which signifies a stored "zero." In this connection, a pulse or the absence of a pulse from source 25 determines whether or not flux in transfluxor $A_1$ switches and, consequently, whether or not a "one" or a "zero" is stored therein. Simultaneously, with the activation of bit pulse source 25 at time $t_2$, the B phase advance pulse source 29 is activated thereby pulsing conductor 30 tending to drive the shift register B transfluxors to the clear state shown in FIG. 3*a*. The B transfluxors already are in the clear state, however, and, consequently, there is no switching of flux therein in response to this pulse.

At time $t_3$ an A phase prime pulse source 31 is activated thereby pulsing conductor 32 for driving the flux in counter transfluxor 11$_0$ into the "one" primed pattern shown in FIG. 2*c* and, accordingly, initiating a normal forward counter cycle. In this connection, the prime pulse is limited in amplitude to a value less than that required for flux switching around a central aperture 12 and of sufficient duration to switch flux about a radial aperture. These limitations are well known in transfluxor diodeless shift registers in order to avoid the false propagation of information. Although conductor 32 also couples legs $i_1$ and $o_1$ of each of the shift register A transfluxors and each counter transfluxor 11$_1$, 11$_2$, 11$_3$ . . . 11$_n$, no priming thereof results because for the stored "zero" condition which obtains in the transfluxors at this juncture in the operation the legs coupled by conductor 32 either are saturated in the direction in which they are urged by the prime pulse or have available to flux switched therein no flux closure path about the radial apertures.

At time $t_4$, shift register A advance pulse source 27 and counter A phase step pulse source 14 are activated thereby pulsing conductors 28 and 15 respectively for driving shift register transfluxor $A_1$ and counter transfluxor 11$_0$ to the "clear" state shown in FIG. 2*a*. Transfluxor $A_1$ already is in the "clear" state and, accordingly, exhibits no significant response to the pulse from source 28. However, transfluxor 11$_0$ including a "one" prime is driven into the "clear" state. The flux switching in leg $o_1$ of transfluxor 11$_0$ induces a pulse in conductor 22$_{01}$ which drives counter transfluxor 11$_1$ to the stored "one" state shown in FIG. 4*b* thus completing a normal forward counter cycle. At this juncture in the operation a stored "zero" appears in shift register transfluxor $B_1$ and a stored "one" appears in the associated counter transfluxor 11$_1$.

At time $t_5$, the B phase prime pulse source 33 is activated thereby pulsing conductor 34, tending to switch the flux in the B transfluxors into the "clear" pattern shown in FIG. 3*a* and, accordingly, completing the first normal cycle of operation for the shift register. However, no changes in magnetic flux in the shift register B transfluxor occur at time $t_5$ because transfluxor $B_1$ includes a "zero" and the remaining B transfluxors already are in the clear state. When the transfluxor $B_1$ is in the "zero" state, the leg $i_1$ thereof coupled by conductor 34 already is saturated in the direction urged by the prime pulse. Legs $o_2$ and $o_1$ of transfluxor $B_1$ also coupled by conductor 34 although not saturated in the direction urged by the prime pulse do not have available a flux closure path for any flux switched therein and, accordingly, do not switch.

At time $t_6$, the second bit or a "one" is stored by activating bit pulse source 25 causing a pulse in conductor 26 for driving the flux in shift register transfluxor $A_1$ into the stored "one" pattern shown in FIG. 2*b*. Thus a second normal cycle for the shift register is initiated. Simultaneously, with the activation of the bit pulse source 25, the B phase advance pulse source 29 is activated thereby pulsing conductor 30 for driving the shift register B transfluxors into the "clear" condition shown in FIG. 3*a*. The B transfluxors again still are in the "clear" condition and, consequently, there is no response to this pulse.

At time $t_7$, the A prime pulse source 31 is again activated causing thereby a pulse in conductor 32 which drives the flux in transfluxor $A_1$ into "one" prime pattern shown in FIG. 2*c*. Thus a second normal forward cycle of operation for the counter is initiated. By this same pulse, the flux in counter transfluxor $11_1$ is driven into the "one" prime pattern shown in FIG. 4*c*. Although the remaining transfluxors $A_2$, $A_3$ . . . $A_n$ and the counter transfluxors $11_0$, $11_2$, $11_3$ . . . $11_n$ also are coupled by conductor 32, no switching occurs there because the affected legs already are saturated in the direction urged by the pulse or do not have flux closure paths available.

At time $t_8$, shift register A phase advance pulse source 27 is activated thereby pulsing conductor 28, switching the flux in transfluxor $A_1$ into the pattern shown in FIG. 2*a* thereby returning the transfluxor to the "clear" state. As a result of the switch in flux in leg $o_1$ of transfluxor $A_1$, a pulse is induced in conductor $35_1$ driving the flux in shift register transfluxor $B_1$ into the "one" pattern shown in FIG. 3*b*. Simultaneously, counter B phase step pulse source 16 is activated thereby pulsing conductor 17 for driving the flux in counter transfluxor $11_1$ to the "zero" or "clear" state shown in FIG. 4*a*. Thus the second normal forward cycle of operation for the counter is terminated. This switching of the flux in transfluxor $11_1$, in turn, induces a pulse in conductor $22_{12}$ which causes flux in counter transfluxor $11_2$ to switch into the "one" or "set" pattern shown in FIG. 4*b*.

At time $t_9$, the B phase prime pulse source 33 is activated thereby pulsing conductor 34, tending to switch the flux in all the B transfluxors into the "one" prime pattern shown in FIG. 3*c* and, accordingly, terminating the second normal cycle of operation for the shift register. As a result of this pulse, the flux in shift register transfluxor $B_1$ is switched into the pattern shown in FIG. 3*c*. There is no switching in the remaining B transfluxors for the reasons discussed in connection with the operations occurring at time $t_5$. The flux switch in leg $o_1$ of transfluxor $B_1$ induces a pulse in conductor $36_{12}$ tending to drive leg $i_1$ of transfluxor $A_2$ upward as viewed in FIG. 2*a*. However, the leg $i_1$ of transfluxor $A_2$ already is saturated upward and no response to the pulse occurs there. At this juncture in the operation a "zero" is stored in transfluxor $B_2$, a "one" is stored in transfluxor $B_1$, and a "one" is stored in transfluxor $11_2$.

Successive bits are introduced into the shift register in the above manner depending solely on the processing rate and block length characteristics of the source, such as a computer, which may be serviced, the exemplary bits described in the foregoing being propagated through the shift register in the aforementioned manner simultaneously with the introduction of successive bits.

The read out of the bits stored in the shift register depends solely on the processing rate and block length characteristics of the receiving circuits such as a transmission system, for example. Accordingly, regardless of the stage in the shift register to which the first bit has advanced in response to the writing of consecutive bits therein, read out occurs only when the transmission system signals the counter that it can accommodate information. The transmission system TS of FIG. 1 so signals the counter by means of a conductor 39*a* connected to the timing circuit 38 for initiating the read-out sequence as described hereinafter. For simplicity, it is assumed that only the two bits described in detail above are in the shift register and that the first bit to be read out is in shift register transfluxor $B_2$. It is to be emphasized that the read-out sequence to be described is for reading out two information bits and if additional bits are to be read out, as may be the case for example if the transmission system accepts blocks of ten bits, repetition of the described read-out cycle for the read out of one bit is correspondingly required.

If a sufficient number of information bits are written into the shift register to occupy the entire register either because there has been no read out or because the read out is not at a fast enough rate to keep up with the write-in rate, a store full detector (S*fd*) is activated by means of a pulse induced in the store full conductor (S*fc*) by flux switching in counter transfluxor $11_n$ through the central aperture 12 of which the conductor is threaded. In this connection the store full detector is any well known detector capable of providing an output signal in response to a flux switching in a magnetic element to which it is connected. The store full detector is connected to the transmission system TS of FIG. 1 by means of a conductor 39*b* for transmitting thereto the output signal of the detector. In response to this signal the transmission system signals timing circuit 38 by means of conductor 39*a* for stopping further input to the register.

In addition, the read-out operation is not initiated until the shift register SR includes a sufficient number of bits to constitute a word block acceptable to the shift register. For illustration, this word block is taken as two bits. Accordingly, a start read detector (S*rd*) is connected to counter transfluxor $11_2$ by means of a start read conductor (S*rc*), initiating the read-out cycle response to flux switching in transfluxor $11_2$. The mechanism for initiating the read-out cycle, that is, the reverse cycle of operation for the counter, is by means of a signal transmitted by means of conductor $39_c$ from the start read detector to the transmission system which in response thereto signals timing circuit 38 for initiating the read-out sequence. Accordingly, in response to the signal from the transmission system indicating that space is available therein, timing circuit 38 initiates the following read-out sequence of two read-out cycles by activating pulse sources 20, 14 and 16 as follows.

At time $t_{10}$ the prime pulse source 20 is activated thereby pulsing conductor 21, tending to drive the flux in all counter transfluxors $11_1$, $11_2$, $11_3$ . . . $11_n$ into the "one" prime pattern shown in FIG. 4*d*, thus initiating the first reverse cycle of operation for the counter. At time $t_{10}$, however, only counter transfluxor $11_2$ is in condition to be switched. The remaining counter transfluxors 11 already are saturated in a direction urged by the prime pulse or do not provide suitable flux closure paths as discussed in connection with the operation at time $t_5$.

At time $t_{11}$, the counter A phase step pulse source 14 is activated thereby inducing a pulse in conductor 15 for driving counter transfluxor $11_2$ to the clear state shown in FIG. 4*a* thus terminating the first reverse cycle of operation for the counter. The flux switched in leg $i_2$ of transfluxor $11_2$ induces a pulse in conductor $24_{12}$ driving transfluxor $11_1$ into the stored "one" or "set" state shown in FIG. 4*e*. Thus, there is recorded in counter transfluxor $11_1$ a "one" while counter transfluxor $11_2$ is driven to a "clear" state. The switch in flux in the leg $i_2$ of transfluxor $11_2$ also induces an interrogating pulse in conductor $37_2$ tending to switch leg $o_2$ of shift register transfluxor $B_2$ downward as viewed in FIG. 3*a*. Since a "zero" is stored in transfluxor $B_2$ at this time, leg $o_2$ already is saturated downward and no response to the interrogating pulse results. Consequently, during the corresponding sensing circuit time slot a null indication or a zero output appears and the first read-out cycle terminates. It is noted that read out of shift register transfluxor $B_2$ is nondestructive and a zero remains therein to be propagated through the register in a conventional manner.

At time $t_{12}$, prime pulse source 20 is again activated thereby pulsing conductor 21 a second time, tending to drive the flux in all counter transfluxor $11_1$, $11_2$, $11_3$ . . . $11_n$ into the pattern shown in FIG. 4*d* thus initiating the second reverse cycle of operation for the counter. However, at this juncture, only transfluxor $11_1$ is in a condition to switch for the reasons discussed in connection with the operation at time $t_5$. Although the flux switched in leg $i_2$ of transfluxor $11_1$ induces a pulse in conductor 23, no switching of the flux in leg $i_1$ of transfluxors $11_0$ results because of the reasons already discussed in connection with the operation at time $t_5$.

At time $t_{13}$, the B phase step pulse source 16 is activated thereby inducing a pulse in conductor 17 for driving counter transfluxor $11_1$ to the "clear" state shown in FIG. 4*a*. As was the case at time $t_{11}$, the next preceding counter transfluxor (here transfluxor $11_0$) is driven to the stored "one" or "set" state. The switch in flux in leg $i_2$ of transfluxor $11_1$ induces an interrogating pulse in conductor $37_1$ tending to switch leg $o_2$ of shift register transfluxor $B_1$ downward as viewed in FIG. 3*a*. Since a "one" prime as shown in FIG. 3*c* is stored in transfluxor $B_1$ at this time, switching thereof occurs in response to the interrogating pulse. Consequently, during the corresponding sensing circuit time slot a pulse appears indicating a stored "one" in transfluxor $B_1$; thus the second reverse cycle of operation for the counter terminates.

The foregoing read-out sequence is described for reading out of the register between the writing of two successive bits a number of bits which constitute a word in the logic arrangement of the transmission system. If the relative write and read rates and/or block length of the transmission system are such that additional bits are introduced before an entire block of bits is read out of the register thus interrupting the read-out sequence, the write and read pulses may be timed to interleave with each other enabling ostensibly uninterrupted write and read operations. From the foregoing, other timing variations should be evident.

The foregoing operation was initiated under the conditions that the counter included no identifying flux condition therein. If the buffer storage circuit has been in use prior to the introduction of the first bit described herein, the identifying condition or set state will be in one stage of the counter as is evident from the foregoing. However, the counter may be cleared merely by pulsing the A phase and B phase read pulse sources simultaneously under the control of timing circuit 38. On the other hand, operation as described hereinbefore may continue unchanged without clearing the counter first.

There are various modifications of the organization of the system in accordance with this invention as illustrated in FIG. 1. Specifically, the first counter transfluxor $11_0$, as illustrated in FIG. 1, includes the set state or identifying condition when all the information bits in the register are read out. Transfluxor $11_0$ is not necessary, however, if means are provided to drive transfluxor $11_1$ to the set state or condition after the shift register is read out completely and prior to the introduction of additional bits.

No effort has been made to describe all possible embodiments of the invention. It should be understood that the embodiment described is merely illustrative of the various forms of the invention and various modifications may be made therein without departing from the spirit and scope of the invention.

What is claimed is:

1. In a shift register having a plurality of stages capable of having a sequence of information bits including a foremost bit shifted therealong, read-out means comprising
   a bistable circuit having set and reset states connected to each stage of said shift register,
   means for setting a preselected one of said bistable circuits to said set state to correspond to the shift of said foremost bit to the corresponding connected stage of said shift register,
   means for resetting said preselected one of said bistable circuits to said reset state,
   first means responsive to said resetting for destructively interrogating the connected shift register stage causing the next subsequent bit to become said foremost bit,
   second means responsive to said resetting for setting the bistable circuit connected to the next preceding shift register stage in which said next subsequent bit is stored, and
   means responsive to the interrogation for sensing the response of the first-mentioned connected shift register stage thereto.

2. In a shift register having a plurality of stages capable of having a sequence of information bits shifted therealong,
   a counter having a plurality of bistable stages having set and reset states each of which stage is connected to a different shift register stage,
   means for introducing a sequence of information bits into the first stage of said shift register,
   means for setting to said set state the counter stage connected to the first stage of the shift register,
   means for advancing said sequence of information bits through the stages of said shift register,
   means for advancing said set state through the stages of said counter in correspondence with the advance of the first bit of said sequence of information bits through said shift register; and
   read-out means comprising
   means for resetting to said reset state the set counter stage,
   means responsive to said resetting of said set counter stage to said reset state for interrogating the corresponding connected shift register stage,
   means responsive to said resetting of said set counter stage to said reset state for setting to said set state the next preceding counter stage, and
   means responsive to the interrogation for sensing the response of the connected shift register stage thereto.

3. An electrical circuit comprising
   a shift register having a plurality of stages capable of having a series of information bits shifted therealong,
   a counter circuit having a plurality of stages each connected to a different one of said plurality of stages of said shift register and also having a stage preceding the first of said plurality of stages,
   means for advancing said counter circuit in correspondence with the shift of the first of said series of information bits in said shift register,
   means for sequentially reversing said counter circuit when said first of said series of information bits reaches a predetermined stage of said shift register, and
   means connected to each stage of said shift register energized responsive to the sequential reversing of said counter circuit for reading out said series of information bits.

4. A circuit including a shift register comprising
   a plurality of stages,
   each of said stages including a first bistable element, said shift register being capable of accommodating a sequence of binary coded information bits advanced therethrough,
a counter comprising
a plurality of stages each including a second bistable element,
said first and second bistable elements having set and reset states,
each of said counter stages being directly connected to a different one of the shift register stages,
means for advancing said information bits through said shift register,
means for registering in successive ones of said counter stages said set state indicative of the position in successive shift register stages of the first of said sequence of information bits; and
means for reading information bits out of said shift register comprising
means for resetting the second element including said set state from said set to said reset state,
means responsive to said resetting of said second element for driving the corresponding connected first element to said reset state,
means for sensing the resetting and absence of resetting of said connected first element, and
means responsive to the resetting of said second element for setting to said set state the next preceding second element.

5. An information buffer circuit comprising
a shift register circuit having a plurality of stages and being capable of having a plurality of information bits shifted therealong,
a reversible counter having a plurality of stages and being capable of having a single information bit advanced therealong,
coupling means for coupling each of said shift register stages to a corresponding one of said counter stages,
means for advancing said counter simultaneously with the advance of said plurality of information bits in said shift register,
means for reversing said reversible counter responsive to the advance of said single information bit to a predetermined stage for generating interrogating signals in said coupling means, and
read-out means for said shift register energized responsive to said interrogating signals for sensing said plurality of information bits as said counter counts backward from said predetermined stage.

6. A magnetic circuit including a shift register comprising
pairs of first and second transfluxors capable of accommodating a sequence of information bits advanced therethrough,
a plurality of third transfluxors each connected to a different one of said second multi-aperture transfluxors,
said second and third transfluxors having set and reset states,
means for advancing said information bits through said shift register,
means for registering in successive ones of said third transfluxors said set state indicative of the position in successive ones of said second transfluxors of the first of said sequence of information bits,
read-out means including a first conductor coupling said third transfluxor,
means for pulsing said first conductor for resetting to said reset state the registering third transfluxor, and
means responsive to said resetting of said registering third transfluxor for driving the corresponding connected second transfluxor to said reset state.

7. A magnetic circuit including a shift register comprising
pairs of first and second transfluxors capable of accommodating a sequence of information bits advanced therethrough,
a plurality of third transfluxors each connected to a different one of said second transfluxors,
said second and third transfluxors having set and reset states,
means for advancing said information bits through said shift register,
means for registering in successive ones of said third transfluxors said set state indicative of the position in successive ones of said second transfluxors of the first of said sequence of information bits; and
read-out means including a first conductor coupled to said third transfluxors,
means for pulsing said first conductor for resetting to said reset state the registering third transfluxor,
means responsive to the resetting of said registering third transfluxor for setting to said set state the next preceding third transfluxor,
means responsive to the resetting of said registering third transfluxor for driving to said reset state the connected second transfluxor, and
means for indicating the resetting and absence of resetting to said reset state of said connected second transfluxor.

References Cited

UNITED STATES PATENTS 3,157,863 11/1964 James ............ 340—174

BERNARD KONICK, *Primary Examiner.*

S. M. URYNOWICZ, *Assistant Examiner.*